W. HOMMEL.
APPARATUS FOR USE IN SOLUTION AND PRECIPITATION PROCESSES.
APPLICATION FILED NOV. 30, 1908.

918,749.

Patented Apr. 20, 1909.
2 SHEETS—SHEET 2.

Witnesses
M. W. Church
Elizabeth Griffith

Inventor
Woldemar Hommel
by Church & Church
his Attys

UNITED STATES PATENT OFFICE.

WOLDEMAR HOMMEL, OF LONDON, ENGLAND, ASSIGNOR TO METALS EXTRACTION CORPORATION, LIMITED, OF LONDON, ENGLAND.

APPARATUS FOR USE IN SOLUTION AND PRECIPITATION PROCESSES.

No. 918,749.   Specification of Letters Patent.   Patented April 20, 1909.

Application filed November 30, 1908. Serial No. 465,285.

*To all whom it may concern:*

Be it known that I, WOLDEMAR HOMMEL, citizen of Swiss Republic, residing at Lee, London, England, have invented certain new and useful Improvements in Apparatus for Use in Solution and Precipitation Processes, of which the following is a specification.

The present invention relates to improvements in apparatus for use in solution and precipitation processes, the object being to provide suitable means for treating pulverulent solid material with liquid, or liquid and gas under pressure, or to precipitate solid matter from a solution by the action of a vacuum with or without the addition of a solid precipitant and a feature of the invention consists in the method of mixing solids and fluids and of conveying the flowing mixture through the apparatus.

The apparatus is particularly suitable for use in the process described in the previous patent application of Hommel and Sulman Serial No. 401513.

Hitherto many different forms of mixing and conveying apparatus having spiral passages therein have been designed and the present invention belongs to this type.

An apparatus according to this invention comprises the combination with a rotatable horizontal cylindrical barrel having inlets for solids and fluids at one end and a tapering outlet at the other end of spiral channels in the drum and in the tapering end for the purpose of mixing the solids and fluids and conveying the flowing mixture through the apparatus. Thus the drum may have at one end a door for the introduction of solids and a central inlet pipe for the introduction of fluids and at the other end a tapering outlet terminating in an outlet valve.

A further feature of the invention consists in the employment in the vessel described of a central inlet pipe perforated to spray the liquid and provided with a brush rotatable in relation to said pipe to clean said perforations.

Where the apparatus is used for precipitation by means of a vacuum, a central pipe may pass through the outlet valve and serve to connect the apparatus with a vacuum pump.

Figure 1:
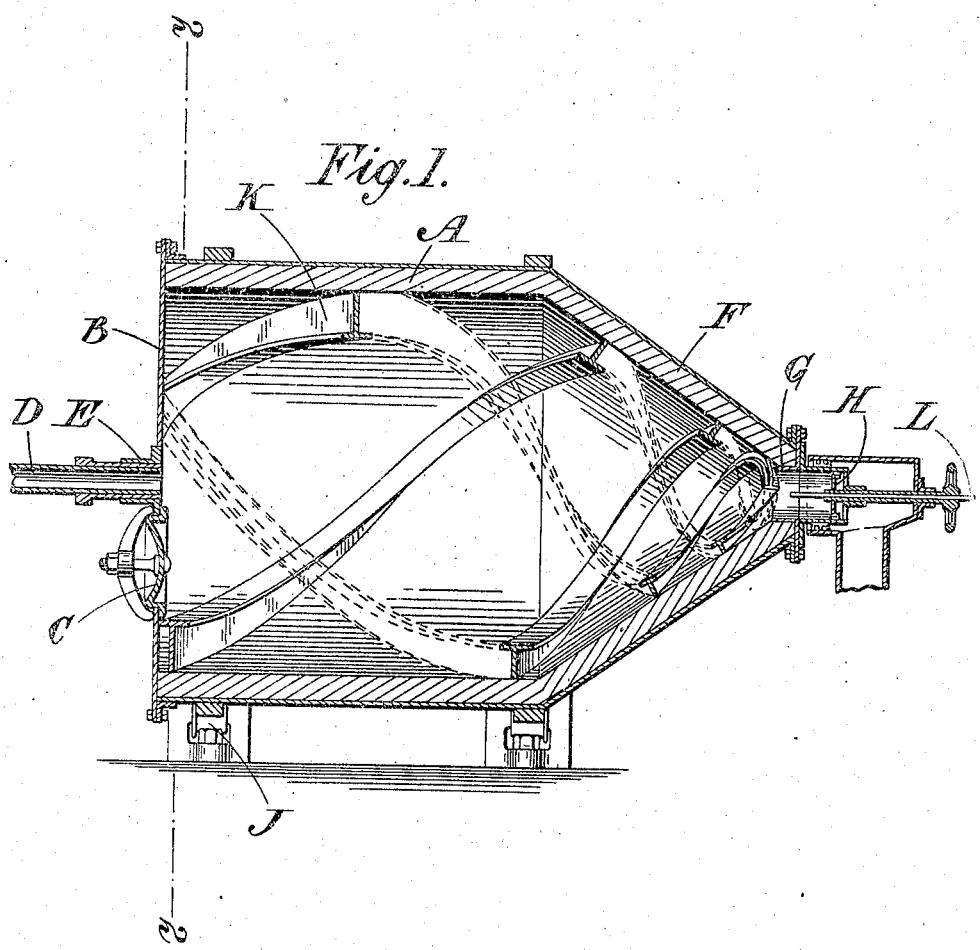
Figure 2:
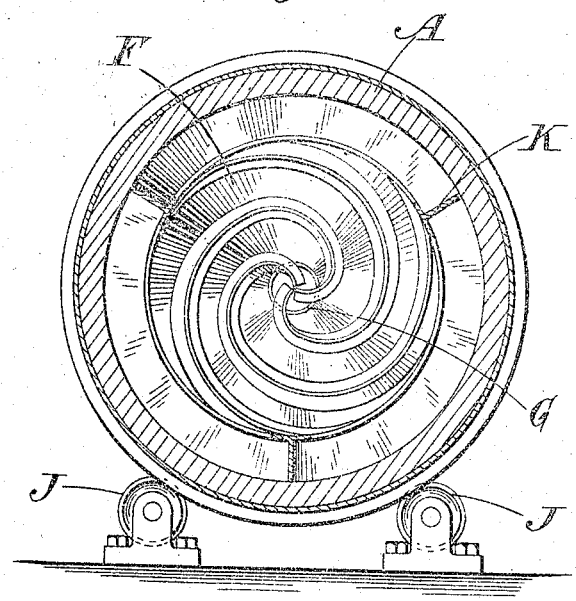
Figure 3:
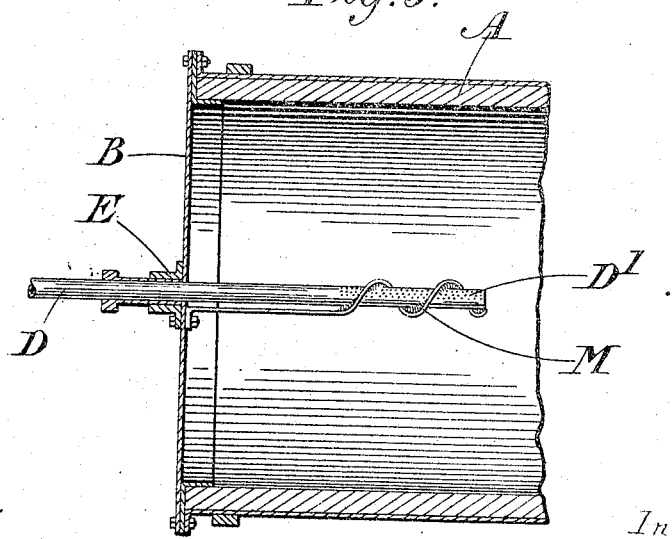

In the accompanying drawings which illustrate by way of example one form of apparatus embodying this invention for use in the process described in the patent application of Hommel and Sulman Serial No. 401513, Figure 1 is a central longitudinal section; Fig. 2 is a transverse section on the line 2—2 of Fig. 1, and Fig. 3 is a part longitudinal section showing a modification in detail. For the sake of clearness the spiral channels are not shown.

The apparatus comprises a cylindrical drum A mounted to rotate on a horizontal axis. At one end of the drum is a flat end plate B provided with a gas-tight door C like a manhole, for the introduction of solids. A central inlet pipe D for fluids (under pressure) passes through a suitable bearing E into the drum. The other end of the drum terminates in a cone F at the apex of which is an outlet conduit G furnished with an outlet valve H. The drum is rotated by any suitable means in either direction and for this purpose the drum may be carried on rollers J. Within the drum are several (say three) spiral channels K which may conveniently be formed by attaching I bars spirally inside the drum (shown in the drawings as T bars.) These spiral passages are continued in the conical outlet end, and the passages are continued right up to the outlet. Instead of I bars, the spiral channels may be formed of metal troughs or otherwise.

Assuming that the apparatus is to be used for treating pulverulent material containing zinc oxid with an aqueous solution of sulfurous acid under pressure, the outlet valve H is closed gas-tight, the solid matter is introduced into the drum through the door C which is then closed gas-tight, water and sulfurous acid under pressure or a highly saturated solution of sulfurous acid under pressure are introduced through the central inlet pipe D and the whole vessel is hermetically closed. The drum is then rotated in either direction to an extent sufficient to mix up the materials thoroughly and effect the desired solution. The outlet valve H is then opened and the drum is rotated in such a direction as to cause the flowing mixture to be conveyed in the channels toward the outlet. The channels take up solids and liquids alike and convey them through the tapering outlet F to the outlet valve and thus the whole contents of the apparatus are discharged.

Where it is desired to introduce the liquid in the form of a spray, the inlet tube D is continued some distance into the drum and is perforated as at $D^1$ or provided with a spraying nozzle, so that the liquid can be sprayed through the perforations or nozzle. Conveniently the inlet pipe is a fixture and a spiral or other brush M rests in contact with the pipe at the perforated part, the brush being attached to the drum so as to rotate therewith and to prevent the perforations from being clogged.

Where it is desired to subject the liquid to the action of a vacuum, a pipe L may pass through the center of the outlet valve and may be connected with a vacuum pump. The same arrangement also may be used, if the apparatus is worked under pressure and a manometer or a safety valve is to be attached.

Assuming that the apparatus is to be used for precipitating zinc monosulfite from a solution of zinc bisulfite, zinc oxid may be introduced into the drum if desired through the door C which is then hermetically closed. The outlet valve H is also hermetically closed and the vacuum pipe L is put in communication with the vacuum pump. The solution of zinc bisulfite is then introduced through the inlet pipe D in the form of a spray and coming under the action of the vacuum (and the zinc oxid if present), the zinc monosulfite is precipitated therefrom.

When the precipitation is complete, the application of vacuum is discontinued, the outlet valve is opened and the drum is rotated in such a way as to convey the liquid and solid contents out through the outlet valve.

It is to be understood that the details of arrangement and construction may be varied without departing from this invention.

What I claim as my invention and desire to secure by Letters Patent is:—

1. In an apparatus for use in solution and precipitation processes the combination of a rotatable horizontal cylindrical barrel having inlets for solids and fluids at one end and a tapering outlet at the other end, and spiral channels in the drum and in the tapering end for the purpose of mixing the solids and fluids and conveying the flowing mixture through the apparatus.

2. In an apparatus for use in solution and precipitation processes the combination of a rotatable horizontal cylindrical barrel a door for the introduction of solids at one end of the barrel and a central inlet pipe for the introduction of fluids, a tapering outlet at the other end of the barrel, an outlet valve at the end of the tapering outlet, and spiral channels arranged in the drum and in the tapering outlet for the purpose of mixing the solids and fluids and conveying the flowing mixture through the apparatus.

3. In an apparatus for use in solution and precipitation processes the combination of a rotatable horizontal cylindrical barrel, a door at one end for the introduction of solids, a central liquid inlet pipe perforated to spray the liquid, a tapering outlet at the other end of the barrel, an outlet valve at the end of the tapering outlet, and spiral channels arranged in the drum and in the tapering outlet for the purpose of mixing the solids and fluids and conveying the flowing mixture through the apparatus.

4. In an apparatus for use in solution and precipitation processes the combination of a rotatable horizontal cylindrical barrel having inlets for solids and fluids at one end and a tapering outlet at the other end, a central pipe passing through the outlet and arranged to connect the apparatus to a vacuum pump, and spiral channels arranged in the drum and in the tapering outlet for the purpose of mixing the solids and fluids and conveying the flowing mixture through the apparatus.

In testimony whereof I have signed my name to this specification in the presence of two subscribing witnesses.

WOLDEMAR HOMMEL.

Witnesses:
PERCY W. H. HIGGINSON,
F. B. BUSS.